W. DUKES.
ROAD VEHICLE WHEEL.
APPLICATION FILED NOV. 13, 1918.

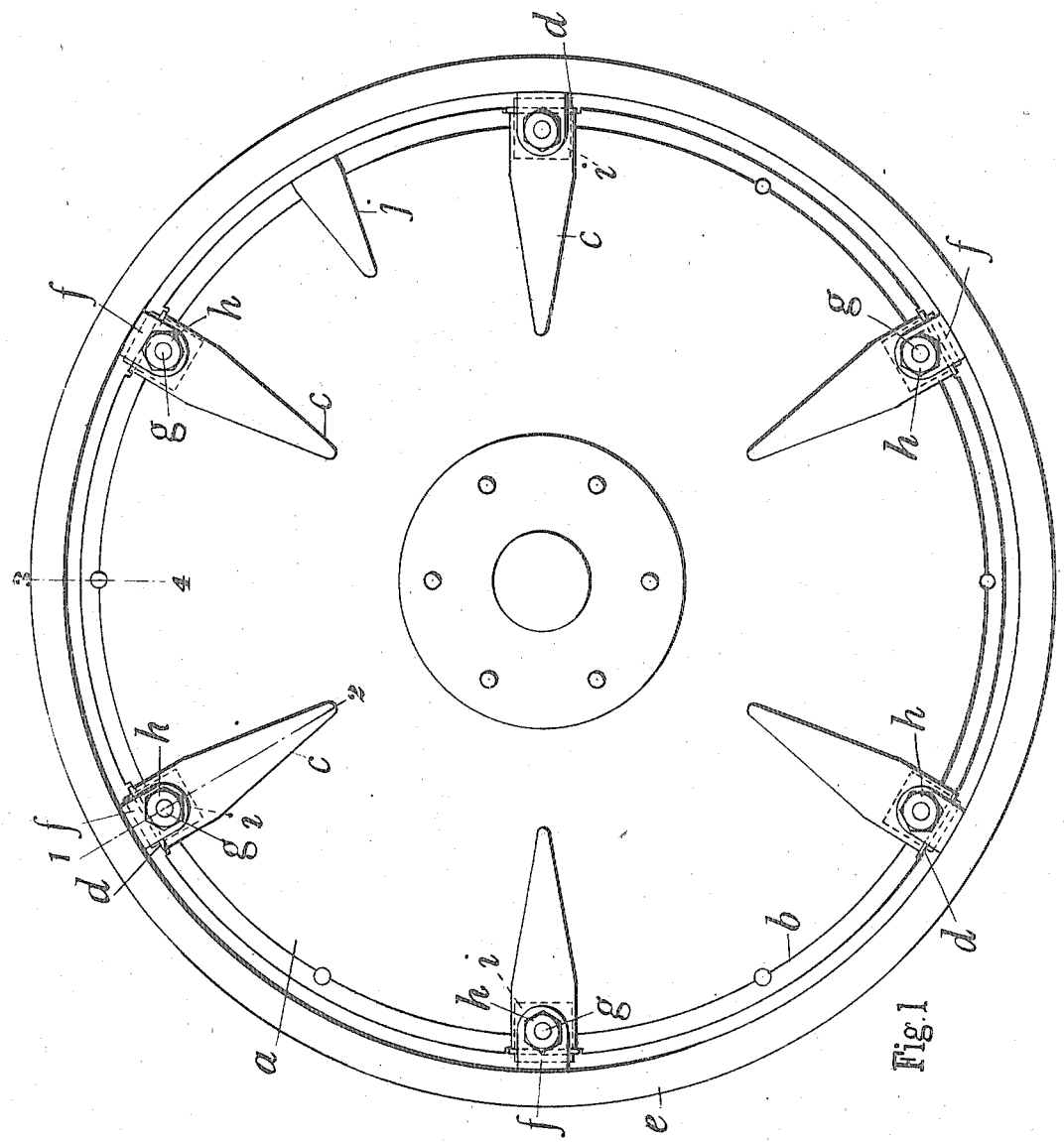

1,315,291.

Patented Sept. 9, 1919.
2 SHEETS—SHEET 2.

Inventor
W. Dukes.
By H. R. Kerslake
Atty.

UNITED STATES PATENT OFFICE.

WILLIAM DUKES, OF BIRMINGHAM, ENGLAND, ASSIGNOR TO THE WARLAND DUAL RIM COMPANY, LIMITED, OF ASTON, BIRMINGHAM, ENGLAND.

ROAD-VEHICLE WHEEL.

1,315,291.  Specification of Letters Patent.  Patented Sept. 9, 1919.

Application filed November 13, 1918. Serial No. 262,342.

*To all whom it may concern:*

Be it known that I, WILLIAM DUKES, a subject of the King of Great Britain and Ireland, residing at York Mills, Witton Lane, Aston, in the city of Birmingham, England, have invented certain new and useful Improvements Relating to Road-Vehicle Wheels, of which the following is a specification.

This invention has for its object to construct an improved road vehicle wheel of the disk type fitted with a detachable rim carrying a pneumatic tire.

The invention comprises the employment of a pair of relatively inclined disks united at their periphery and formed with sockets for the reception of abutment pieces which carry the detachable rim.

In the two accompanying sheets of explanatory drawings:—

Figure 1 is a side elevation of a wheel constructed in accordance with this invention.

Figure 4:
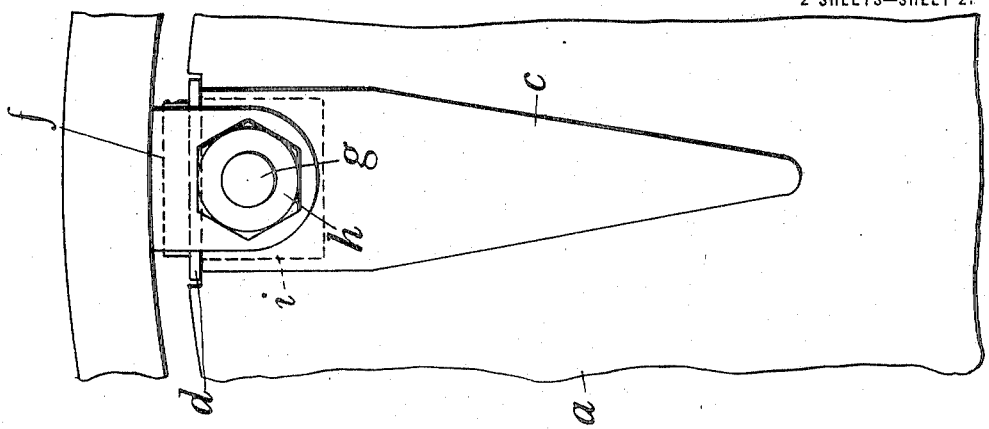
Figure 3:
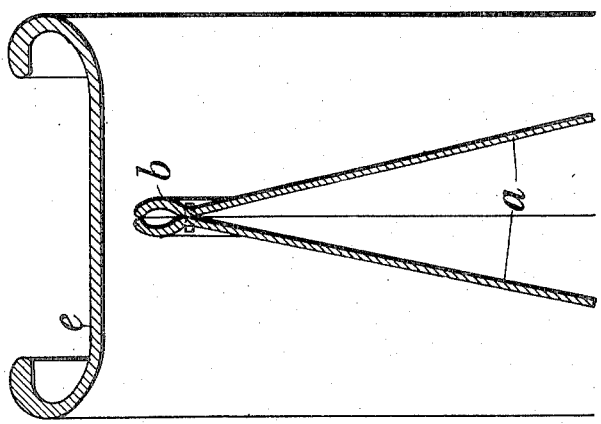
Figure 2:
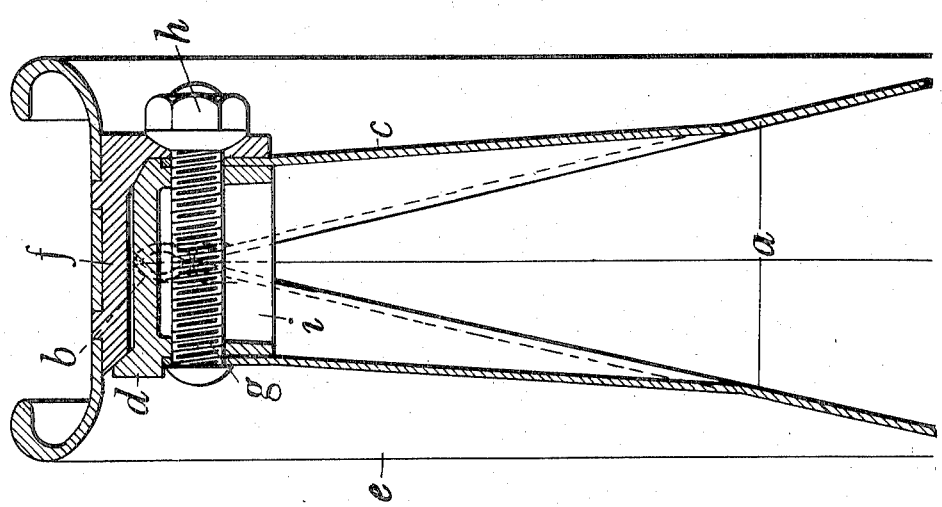

Figs. 2 and 3 are cross sections on the lines 1. 2. and 3. 4. (Fig. 1) and Fig. 4 is an elevation showing one of the socket and abutment pieces, Figs. 2 to 4 being shown to a larger scale than Fig. 1.

In carrying the invention into effect as shown, a pair of metal disks $a$ are dished or otherwise shaped to form the relatively inclined sides of the wheel center. These disks are united at their periphery by rivets or by welding or otherwise. To stiffen the disks their peripheral portions are beaded as shown at $b$.

Each disk has integrally formed with it a number of radially disposed sockets $c$ having their open outer ends at the periphery of the disks. Either the whole of the socket may be formed in one disk, the other disk then serving to close the open side of the socket, or one-half may be formed in one disk and the corresponding half in the other as shown. Whatever construction is adopted the result is such that around the combined disks are a number of equally spaced sockets into each of which can be inserted and secured a rim abutment piece or support $d$.

The detachable rim $e$ is constructed to fit over the periphery of the disks and is provided with seating pieces $f$ which rest upon the abutments, suitable fastening devices such as nuts $h$ attached to screws $g$ passing through lugs $i$ on the seating pieces as well as through the disks and abutment pieces being provided to detachably secure the rim in position.

Around the axis of the wheel a wood block may be secured between the disks to support the same and the hub which is inserted through the disks. If desired a wood disk may be secured between the outer metal disks and the latter may be attached thereto in any convenient manner.

By this invention I provide a disk wheel which enables a detachable rim to be combined with it in a very simple and convenient manner.

The disks may be made to a variety of shapes. Thus both may be equally and oppositely inclined to the central plane of the wheel, or one may be flat and the other inclined, or both may be inclined in the same direction but at different angles. Also the shape and disposition of the sockets may be varied to suit different abutments and fastening devices for the detachable rim. If desired an extra socket $j$ may be provided to accommodate the tire valve.

Having thus described my invention what I claim as new and desire to secure by Letters Patent is:—

1. In road vehicle wheels, the combination comprising a pair of relatively inclined disks united at their peripheries, sockets formed between the disks at their peripheries, abutment pieces inserted in the sockets, a detachable rim supported on the abutment pieces, and means for securing the rim to the abutment pieces, substantially as described.

2. In road vehicle wheels, the combination comprising a pair of relatively inclined disks united at their peripheries, radially disposed sockets formed between the disks at their peripheries, abutment pieces inserted in the sockets, a detachable rim, seating pieces on the rim coacting with the abutment pieces, lugs on the seating pieces, and a fastening screw passing through each lug, socket and abutment piece, substantially as described.

In testimony whereof I have signed my name to this specification.

WILLIAM DUKES.